United States Patent [19]
Tanimura et al.

[11] 3,785,861
[45] Jan. 15, 1974

[54] MELAMINE RESINS FOR IMPROVING SURFACE PROPERTIES OF SHAPED ARTICLES OF SYNTHETIC RESINS

[75] Inventors: Noboru Tanimura, Niza; Kenji Mori, Tokyo; Hirosi Tanaka, Niza, all of Japan

[73] Assignee: Asahi Kasei Kogyo Kabushiki Kaisha, Kita-ku, Osaka, Japan

[22] Filed: Mar. 3, 1972

[21] Appl. No.: 231,735

[30] Foreign Application Priority Data
Mar. 12, 1971  Japan.............................. 46/13078
June 1, 1971  Japan.............................. 46/37480
June 16, 1971  Japan.............................. 46/42493
July 23, 1971  Japan.............................. 46/54650

[52] U.S. Cl.... 117/138.8 B, 117/138.8 A, 138.8 N, 117/138.8 F, 117/138.8 R, 117/138.8 UA, 117/145, 117/161 C, 117/161 LN, 117/161 UN, 260/15
[51] Int. Cl...... B44d 1/22, C08b 21/08, C08a 37/32
[58] Field of Search............... 260/15; 117/138.8 A, 117/138.8 B, 138.8 R, 144; 167/161 UN, 161 LN

[56] References Cited
UNITED STATES PATENTS
3,562,001  2/1971  McGuire............................ 156/242
3,414,531  12/1968  Sears et al. ........................ 260/15

*Primary Examiner*—William H. Short
*Assistant Examiner*—Edward Woodberry
*Attorney*—Burgess, Dinklage & Sprung

[57] ABSTRACT

A composition comprising (A) 100 parts by weight of an etherified methylolmelamine of the formula

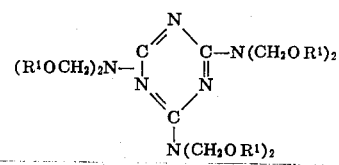

wherein $R^1$ represents an alkyl group having 1 to 4 carbon atoms, (B) about 0.01 to 5 parts by weight of a nitrocellulose, (C) about 1 to 50 parts by weight of at least one alkyleneglycol selected from the group consisting of:

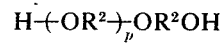

and

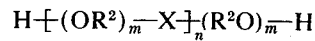

wherein $R^2$ represents $-CH_2CH_2-$, $-CH_2CH(CH_3)-$ or $-(CH_2)_4-$ group; $p$ is 0 or a positive integer; X represents

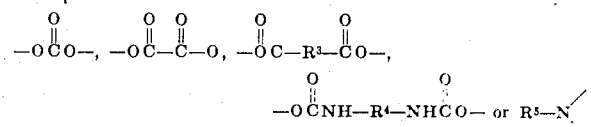

group wherein $R^3$ represents an alkylene group having 1 to 14 carbon atoms, phenylene or cyclohexylene group; $R^4$ represents an alkylene group having 2 to 17 carbon atoms, phenylene or cyclohexylene group; $R^5$ represents an alkyl group having 1 to 8 carbon atoms and when X represents

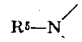

group $R^2$ is $-CH_2CH_2-$ group; $m$ represents an positive integer; and $n$ is an integer of 1 to 10, and (D) about 0.01 to 12 moles, based on one mole of said etherified methylolmelamine, of an acid catalyst.

The compositions are heat-cured on the surfaces of shaped articles of synthetic resins. The heat-cured coatings are characterized by good hardness, mar resistance, abrasion resistance, antistat as well as good surface glass without losing the transparency of synthetic resins.

20 Claims, No Drawings

MELAMINE RESINS FOR IMPROVING SURFACE PROPERTIES OF SHAPED ARTICLES OF SYNTHETIC RESINS

This invention relates to novel compositions for improving surface properties of shaped articles of synthetic resins.

Generally synthetic resins are soft and the surfaces are apt to be marred on wiping off dust or scratching and the difficulty in preserving the beautiful appearance of synthetic resins such as glass and transparency for a long period lowers practical values of synthetic resins. Furthermore, synthetic resins are easily charged by friction and this charging promotes adhesion of dust and accelerates to have the surfaces of synthetic resins marred.

In order to avoid these disadvantages there are employed methods of coating surfaces of synthetic resins with thermal curing resins including, for example, melamine resins. But the adhesion of a melamine resin alone to a shaped article of synthetic resins is insufficient. In order to improve the adhesion several methods are already provided. Japanese Patent Publication No. 3989/1959 describes the coating of a shaped article of vinyl chloride resins or acrylic resins with a thermal curing resin such as a melamine resin and before application of the thermal curing resin a continuous film layer of a polyester type resin is formed on the surfaces of the shaped article. According to Japanese Patent Publication No. 7392/1965, in order to increase the surface hardness of a shaped article of styrene-acrylonitrile type copolymers a mixture of an etherified methylolmelamine, a nitrocellulose and an alkyd resin is heat-cured in the presence of a polyfunctional carboxylic acid. Japanese Patent Publication No. 109/1971 relates to an improved process in which a mixture of an etherified methylolmelamine, a polyfunctional allyl compound or a polyfunctional vinyl compound, a nitrocellulose and a non-drying oil modified alkyd resin is heat-cured in the presence of a polyfunctional carboxylic acid and a radical polymerization catalyst and thus mar resistance of a shaped article is increased. However, according to Japanese Patent Publication Nos. 7392/1965 and 109/1971 when the amount of the etherified melamine is greater than that of the alkyd resin the compatibility of the both is poor and the mixture becomes easily opaque. The decrease of transparency and gloss is observed on the heat-cured shaped articles.

It is accordingly an object of this invention to provide a novel coating composition which gives a heat-cured product having good hardness, mar resistance, abrasion resistance, antistat as well as good surface gloss and transparency.

Another object of this invention is to provide a novel coating composition which substantially avoids the difficulties of prior art etherified methylolmelamine type coating compositions.

Other and additional objects of this invention will become apparent from a consideration of this entire specification and claims.

In accord with and fulfilling these objects, there is provided a coating composition comprising (A) 100 parts by weight of an etherified methylolmelamine of the formula

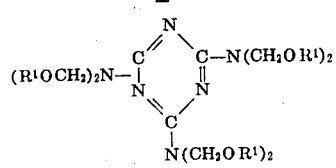

wherein $R^1$ represents an alkyl group having 1 to 4 carbon atoms, (B) about 0.01 to 5 parts by weight of a nitrocellulose, (C) about 1 to 50 parts by weight of at least one alkyleneglycol selected from the group consisting of:

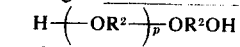

and

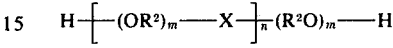

wherein $R^2$ represents $-CH_2CH_2-$, $-CH_2CH(CH_3)-$ or $-(CH_2)_4-$ group; $p$ is 0 or a positive integer; X represents

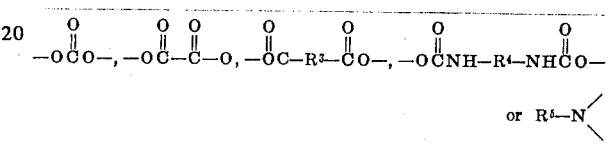

or 

group wherein $R^3$ represents an alkylene group having 1 to 14 carbon atoms, phenylene or cyclohexylene group; $R^4$ represents an alkylene group having 2 to 17 carbon atoms, phenylene or cyclohexylene group; $R^5$ represents an alkyl group having 1 to 8 carbon atoms and when X represents $$R^5-N\diagup$$

group $R^2$ is $-CH_2CH_2-$ group; $m$ represents an positive integer; and $n$ is an integer of 1 to 10, and (D) about 0.01 to 12 moles, based on one mole of said etherified methylolmelamine, of an acid catalyst.

Examples of suitable etherified methylolmelamines include hexakis(methoxymethyl)melamine, hexakis(ethoxymethyl)melamine, hexakis(n-propoxymethyl)melamine, hexakis(isopropoxymethyl)melamine, hexakis(n-butoxymethyl)melamine, hexakis(isobutoxymethyl)melamine, hexakis(secbutoxymethyl)melamine and hexakis(tert-isobutoxymethyl)melamine.

The nitrocelluloses are employed for obtaining an increased adhesion to shaped articles of synthetic resins after heat-curing and preferably used in an amount of from about 0.01 to 5 parts by weight based on 100 parts by weight of an etherified methylolmelamine. When the amount is less than about 0.01 part by weight, the desired effects are hardly realized. On the other hand, amounts of more than about 5 parts by weight remarkably increase the viscosity of a solution of coating compositions and consequently it is difficult to obtain a uniform and regular coating.

It is preferred that the nitrocelluloses have a nitrogen content of about 9 to 12.5 weight percent, more preferably 10.7 to 12.5 weight percent and an average degree of polymerization of about 30 to 1,000, more preferably 35 to 480.

The alkyleneglycols are employed for obtaining a desirable flexibility and mar resistance after heat-curing and preferably used in an amount of about 1 to 50 parts weight based on 100 parts by weight of an etherified methylolmelamine. When the amount is less than about 1 part by weight, the desired effects are hardly realized. On the other hand, amounts of more than about 50 parts by weight reduce the surface hardness of a coating.

Examples of suitable alkyleneglycols include ethyleneglycol, propyleneglycol, tetramethyleneglycol, polyethyleneglycols having an average molecular weight of up to about 100,000, polypropyleneglycols having an average molecular weight of up to about 10,000 and polytetramethyleneglycols having an average molecular weight of up to about 10,000; and modified polyalkyleneglycols obtained by linking one of the alkyleneglycols or polyalkyleneglycols aforementioned with a group selected from

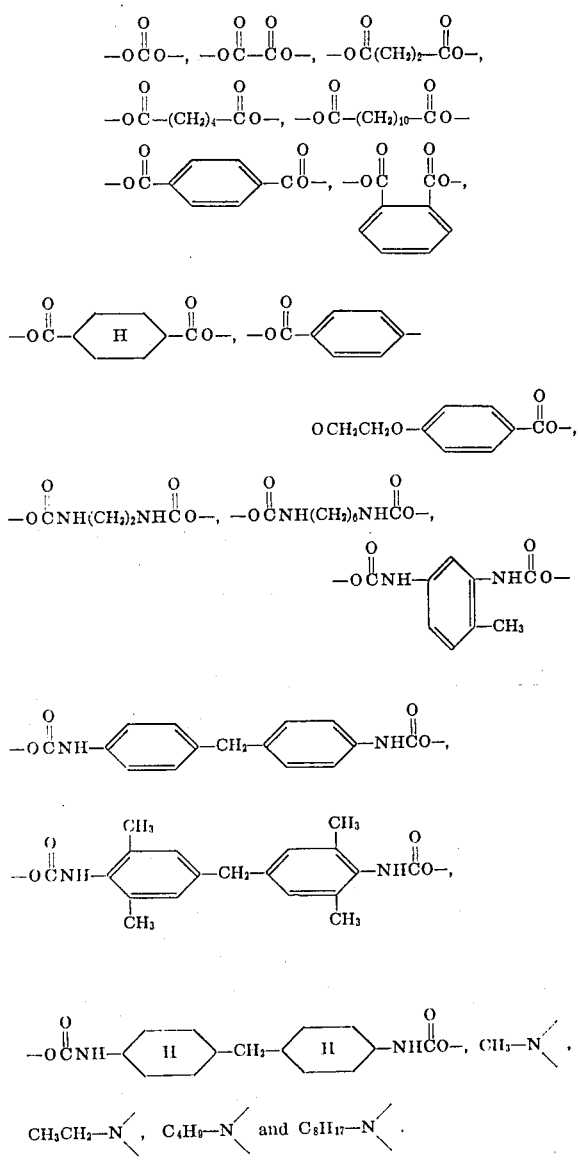

Carbonate modified polyalkyleneglycols may be prepared by reacting an alkyleneglycol with diethyl carbonate in the presence of metallic sodium as a catalyst under heating at a temperature of from about 80°C. to 100°C. Carboxylate modified polyalkyleneglycols may be prepared by reacting an alkyleneglycol with a dicarboxylic acid such as oxalic acid, succinic acid, adipic acid, decanedioic acid, terephthalic acid, phthalic acid, isophthalic acid, 1,4-cyclohexylene dicarboxylic acid, 1,2-diphenoxyethane-p,p'-dicarboxylic acid, and the like, in the presence or absence of p-toluenesulfonic acid as a catalyst under heating above 100°C. Urethane modified polyalkyleneglycols may be obtained by reacting an alkyleneglycol with a diisocyanate such as ethylene diisocyanate, hexamethylene diisocyanate, 2,4-tolylene diisocyanate, 4,4'-diphenyl-methane diisocyanate, 4,4'-(3,5,3',5'-tetramethyldiphenylmethane) diisocyanate, 4,4'-dicyclohexylmethane diisocyanate, and the like in the presence or absence of a basic catalyst such a tertiary amine. Amine modified polyalkyleneglycols may be obtained by reacting under heating ethyleneoxide with a monoalkyl amine such as methylamine, ethylamine, n-butylamine, n-octylamine, and the like under a pressure.

In order to improve abrasion resistance to the friction of surfaces of shaped articles with paper or cloth under a load, about 0.1 to 20 parts by weight, based on 100 parts of an etherified methylolmelamine, of tetramethylsilicate or tetraethyl silicate is preferably added to the coating composition. When the amount of tetramethyl silicate or tetraethyl silicate is less than about 0.1 part by weight, the abrasion resistance is not significantly increased. On the other hand amounts of more than about 20 parts by weight retard the heat-curing reaction.

In order to color a heat-cured layer of the coating composition it is preferred that the coating composition additionally contains about 0.5 to 6 parts by weight, based on 100 parts by weight of an etherified methylolmelamine, of an oil soluble dye. When the amount is more than about 6 parts by weight, the adhesion to a shaped article diminishes and the coated layer tends to be easily peeled off. Also when the amount is less than about 0.5 parts by weight, coloring is very shallow.

Examples of suitable oil soluble dyes include dyes corresponding to Color Indices, Solvent Yellow 2, t, 15, 16, 19, 21, 56, 61 and 80; Solvent Orange 1, 2, 5, 6, 14, 37, 40 and 45; Solvent Red 1, 8, 23, 30, 49, 81, 82, 83, 84, 100, 109 and 121; Solvent Violet 8, 21, 27; Solvent Blue 12, 45, 55 and 73; Solvent Brown 20, 37; and Solvent Black 3, 5, 22 and 23.

Examples of suitable acid catalysts include hydrochloric acid, phosphoric acid, p-toluenesulfonic acid, oxalic acid and acetic acid. The acid catalysts are used in an amount of about 0.01 to 12 moles, preferably about 0.5 to 2 moles per mole of an etherified methylolmelamine.

The shaped articles of synthetic resins which may be coated with the compositions of this invention include, for example, plates, sheets, plastic lenses, covers of meters, covers of lighting fixtures, displays, and the like.

Examples of suitable synthetic resins include cellulose derivatives such as cellulose diacetates, cellulose triacetates, acrylonitrile-butadiene-styrene copolymers, polycarbonates, polyamides such as polycapramides, polyhexamethylene adipamides, polyhexamethylene sebacamides, polylaurolactams, unsaturated polyesters, polymethylmethacrylates and methylmethacrylate copolymers containing about 0.5 to 15 mole percent of methylacrylate unit.

The solution of coating compositions are obtained by dissolving the above-mentioned components in a solvent. For shaped articles of polymethylmethacrylates, cellulose diacetates, cellulose triacetates, polycarbonates, polyamides, acrylonitrile-butadiene-styrene copolymers and unsaturated polyesters, it is preferred to use a mixture solvent essentially comprising (a) at least one alcohol selected from methanol, ethanol, n-propanol, isopropanol, n-butanol, isobutanol and tertiary butanol, (b) chloroform, (c) at least one acetate selected from methyl acetate, ethyl acetate, n-propyl acetate, isopropyl acetate, n-butyl acetate, isobutyl acetate, tertiary butyl acetate, n-amyl acetate, isoamyl acetate and n-hexyl acetate and (d) water. For shaped articles of methylmethacrylate copolymers containing about 0.5 to 15 mole percent of methylacrylate unit, it is preferred to use a mixture solvent essentially comprising (a) at least one alcohol selected from methanol, ethanol, n-propanol, isopropanol, n-butanol, isobutanol and tertiary butanol, (b) at least one ketone selected from acetone, methylethylketone, diethylketone, methylisobutylketone and cyclohexanone and (c) water.

To obtain a solution of coating compositions, an etherified methylolmelamine, a nitrocellulose, an alkyleneglycol and, if necessary, tetramethyl or tetraethyl silicate and an oil soluble dye are dissolved in the abovedescribed mixture solvent at a concentration of about 20 to 70 weight percent. Separately, an acid catalyst is dissolved in or mixed with an alcohol such as methanol, ethanol or an alcohol-water to prepare an about 0.1 to 5 N solution. Then this acid catalyst solution is sufficiently mixed with the above-mentioned solution.

The solutions of coating compositions may be coated on shaped articles of synthetic resins by a brush or a spray gun. Also shaped articles may be immersed for about 10 seconds to 2 minutes.

The thickness of a layer of coating compositions is preferably about 0.5 micron to 30 microns after heat-curing.

The shaped articles of synthetic resins coated with the compositions of this invention are subjected to curing reaction. The temperature of curing reaction is preferably from about 50°C. to lower than the heat distortion temperature of synthetic resins and the time of curing reaction depends on the temperature and is generally from about 10 minutes to 10 hours.

This invention will now be illustrated by the following examples in which parts are all by weight unless expressly stated to contrary.

EXAMPLE 1

30 parts of hexakis(n-butoxymethyl)melamine, 6 parts of urethane modified polyethylene glycol prepared by reacting polyethylene glycol having an average molecular weight of 1,000 and hexamethylene diisocyanate at a mole ratio of 3 : 2 and a desired amount of nitrocellulose having a nitrogen content of 11.9 weight percent and an average degree of polymerization of 85 set forth in Table 1 were dissolved in a mixture solvent consisting of 15 parts of ethanol, 65 parts of chloroform, 15 parts of isobutyl acetate, 2 parts of n-amyl acetate and 3 parts of water. Separately, a 35 percent hydrochloric acid solution was diluted with methanol to obtain a 0.8 N solution. The resulting solution was mixed with the above-described solution at a volume ratio of 1 : 1. After the resulting solution was left to stand at 20°C. for one hour, a 6 cm. × 6 cm. cast plate of 3 mm. thick polymethylmethacrylate was immersed in the solution for 20 seconds. Then, the plate was removed from the solution and subjected to curing reaction at 100°C. for 2 hours in a hot air drier. The thickness of a coating was 3 microns. The plate thus obtained was subjected to the following tests and the results are shown in Table 1.

Adhesion: A grid of eleven horizontal and eleven vertical lines spaced 1 mm. apart is scratched by a razer blade through the coating into the plate beneath. Then a pressure sensitive tape is firmly attached to the grid and rapidly pulled away. Adhesion is shown by the number a sections which are not peeled off. For example, 100/100 shows that the 100 sections are all intact, which shows good adhesion.

Pencil hardness: Using a pencil hardness tester made by Nihon Rigaku Kogyo, the resin surface is scratched with a testing pencil at an angle of 45° under a load 1,000 grams. If scratches are seen in 3 to 5 tests out of 5, the testing pencil is replaced with another pencil lower by one rank and, in 1 to 2 tests, the hardness of the pencil used is shown.

Mar resistance: Tests for mar resistance are made in accordance with ASTM D-673-44. On a test specimen slant at 45°, 400 g. of No. 80 mesh carborundum are dropped from a height of 25 inches.

Gloss retention is obtained by measuring specular gloss of the specimen thus treated with a gloss meter in accordance with Japanese Industrial Standard No. Z8741. 100 of gloss retention means the value obtained by measuring specular gloss of a specimen before mar resistance test. Also transmission retention is obtained by measuring transmission at 570 mμ.

Specular gloss: Specular gloss is measured in accordance with Japanese Industrial Standard No. K5400-1970.

Table 1

| Run No. | Amount of nitrocellulose (part) | Film performance coated layer | Adhesion | Pencil hardness | Mar resistance | |
|---|---|---|---|---|---|---|
| | | | | | Gloss retension (%) | Transmission retension (%) |
| 1 | 0 | Good | 0/100 | 3H | 25 | 67 |
| 2 | 0.003 | Good | 80/100 | 4H | 48 | 70 |
| 3 | 0.03 | Good | 100/100 | 5H | 63 | 80 |
| 4 | 0.3 | Good | 100/100 | 6H | 70 | 82 |

Table 1—Continued

| Run No. | Amount of nitrocellulose (part) | Film performance coated layer | Adhesion | Pencil hardness | Mar resistance | |
|---|---|---|---|---|---|---|
| | | | | | Gloss retention (%) | Transmission retention (%) |
| 5 | 1.5 | Slightly irregular in thickness | 100/100 | 5H | 60 | 74 |
| 6 | 3.0 | Slightly irregular in thickness | 100/100 | 4H | 47 | 70 |
| 7 | 3.5 | Irregular in thickness | 100/100 | 3H | 40 | 68 |
| Reference Uncoated plate | — | | — | 3H | 11 | 65 |

Specular gloss of uncoated plate was 75% of that of coated plate.

EXAMPLE 2

30 parts of hexakis(methoxy methyl)melamine, a desired amount of urethane modified polyethylene glycol prepared by reacting polyethylene glycol having an average molecular weight of 1,000 and hexamethylene diisocyanate at a mole ratio of 2 : 1 shown in Table 2 and 0.3 part of nitrocellulose having a nitrogen content of 11.9 weight percent and an average degree of polymerization of 85 were dissolved in a mixture solvent consisting of 40 parts of ethanol, 48 parts of chloroform, 11 parts of isobutyl acetate and 1 part of n-amyl acetate. Separately, a 35 percent hydrochloric acid solution was diluted with methanol to obtain a 1.4 N solution. This solution was mixed with the above-described solution at a volume ratio of 1 : 2. After the resulting solution was left to stand at 20°C. for 1 hour, a 6 cm. × 6 cm. cast plate of 3 mm. thick polymethylmethacrylate was immersed in the solution for 30 seconds. Then the plate was removed from the solution and subjected to curing reaction at 80°C. for 2 hours in a hot air drier. The thickness of a coating was 2 microns. This plate was subjected to the same tests as in Example 1 and Antistat test. The results are shown in Table 2.

Antistat test: Saturated static charged and its half life time are measured by a "Static Honestomer" (made by Shishido Shokai). A sample is placed on a turn table and while rotating the turn table at 7,000 r.p.m., an electromotive force of −10,000V is impressed at a point and the charged static of the specimen is detected at the opposite. When the charged static is saturated, impress is stopped and then decay of the charged static is observed. Half life is defined as the time when the charged static becomes ½ of the saturated one. The sample, after curing, is kept at 65% RH for 24 hours and measured at 25°C. and 65% RH.

Table 2

| Run No. | Urethane modified polyethylene glycol (part) | Adhesion | Pencil hardness | Mar resistance | | Antistat |
|---|---|---|---|---|---|---|
| | | | | Gloss retention (%) | Transmission retention (%) | Half life time of charged static (sec.) |
| 1 | 0 | 100/100 | 4H | 48 | 67 | 200 |
| 2 | 0.3 | 100/100 | 5H | 58 | 72 | 43 |
| 3 | 1 | 100/100 | 6H | 66 | 78 | 25 |
| 4 | 5 | 100/100 | 6H | 70 | 84 | 15 |
| 5 | 10 | 100/100 | 6H | 65 | 84 | 6.3 |
| 6 | 15 | 100/100 | 5H | 62 | 72 | 4.1 |
| 7 | 20 | 80/100 | 3H | 15 | 65 | 3.5 |
| Reference Uncoated plate | | — | 3H | 11 | 65 | |

EXAMPLE 3

30 parts of hexakis(methoxy methyl)melamine, 0.3 part of nitrocellulose having a nitrogen content of 10.5 weight percent and an average degree of polymerization of 150, 6 parts of a urethane modified polyethylene glycol prepared by reacting polyethylene glycol having a molecular weight of 1,000 and hexamethylene diisocyanate at a mole ratio of 3 : 2 and a desired amount of tetraethyl silicate shown in Table 3 were dissolved in a mixture solvent consisting of 15 parts of ethanol, 65 parts of chloroform, 15 parts of isobutyl acetate, 2 parts of n-amyl acetate and 3 parts of water. Separately, a 35 percent hydrochloric acid solution was diluted with ethanol to obtain a 0.8N solution. This solution was mixed with the above-described solution at a volume ratio of 1 : 1. After the resulting solution was left to stand at 20°C. for 1 hour, a 6 cm. × 6 cm. cast plate of 3 mm. thick polymethylmethacrylate which was well washed and dried was immersed in the solution for 25 seconds. Then the plate was removed from the solution and subjected to curing reaction at 100°C. for 1 hour. The thickness of coating was 3 microns. The plate thus obtained was subjected to the same tests as in Example 1 and abrasion test. The results are shown in Table 3.

marred at 100 traveling times but gets marred at 120 traveling times.

EXAMPLE 4

30 parts of hexakis(methoxymethyl)melamine, 1.5 parts of tetramethyl silicate, 1.5 parts of polyethyleneglycol having an average molecular weight of 400 and a desired amount of nitrocellulose having a nitrogen content of 10.5 percent and an average degree of polymerization of 150 set forth in Table 4 were dissolved in a mixture solution consisting of 49 parts of ethanol, 4 parts of n-butanol, 46 parts of methylethyl ketone and 1 part of water. Separately, a 35 percent hydrochloric acid solution was diluted with water to obtain a 1.0N solution. This solution was mixed with the above-described solution at a volume ratio of 1 : 1. After the resulting solution was left to stand at 25°C. for 5 hours, a 10 cm. × 10 cm. extruded sheet of 3 mm. thick methylmethacrylate copolymer containing 6 mole percent of methyl acrylate was immersed in the solution for 30 seconds. Then the sheet was removed from the solution and subjected to curing reaction at 80°C. for 1 hour in a hot air drier. The thickness of a coating was 3 microns. The results of the same tests as in Example 3 together with half life time of charge static are shown in Table 4.

Table 3

| Run No. | Amount of tetraethyl silicate (part) | Film of performance coated layer | Adhesion | Pencil hardness | Mar resistance | | Abrasion resistance |
|---|---|---|---|---|---|---|---|
| | | | | | Gloss retention (%) | Transmission retention (%) | |
| 1 | 0 | Good | 100/100 | 6H | 69 | 80 | 300-320 |
| 2 | 0.003 | Good | 100/100 | 6H | 70 | 80 | 320-340 |
| 3 | 0.03 | Good | 100/100 | 6H | 73 | 84 | 580-600 |
| 4 | 0.3 | Good | 100/100 | 6H | 75 | 85 | 720-740 |
| 5 | 3.0 | Good | 100/100 | 6H | 71 | 83 | 760-780 |
| 6 | 5.0 | Good | 100/100 | 6H | 73 | 85 | 760-780 |
| 7 | 7.0 | Uneven | 100/100 | 4H | 58 | 70 | 560-580 |
| Reference Uncoated Plate | — | — | — | 3H | 11 | 65 | 2-4 |

Specular gloss of uncoated plate was 75% of that of coated plate.

Table 4

| Run No. | Amount of nitrocellose (part) | Film of performance coated layer | Adhesion | Pencil hardness | Mar resistance | | Abrasion resistance | Antistat |
|---|---|---|---|---|---|---|---|---|
| | | | | | Gloss retention (%) | Transmission retention (%) | | Half life time of charged static (sec.) |
| 1 | 0 | Good | 0/100 | 2H | 19 | 50 | 1-2 | 5 |
| 2 | 0.003 | Good | 62/10 | 3H | 45 | 62 | 120-140 | 5 |
| 3 | 0.03 | Good | 95/100 | 4H | 58 | 72 | 240-260 | 4 |
| 4 | 0.3 | Good | 100/100 | 5H | 64 | 78 | 300-320 | 4 |
| 5 | 1.5 | Slightly irregular in thickness | 100/100 | 4H | 59 | 74 | 280-300 | 4 |
| 6 | 2.0 | Irregular in thickness | 100/100 | 3H | 50 | 65 | 220-200 | 4 |
| Reference Uncoated sheet | — | — | — | 2H | 8 | 35 | 1-2 | 8,000 |

Abrasion: Tests for abrasion are made by using "Sutherland Type Ink Rub Tester" (made by Toyo Seiki Co., Ltd.). The surface of a sample is rubbed with filter paper (made by Toyo Filter Co., Ltd. Filter Paper No. 5C) under a load of 4 pounds. The number of traveling time at which the surface of the sample begins to be marred is shown. For example, 100-120 means that the surface is not

EXAMPLE 5

30 parts of hexakis(methoxymethyl)melamine, 0.3 part of nitrocellulose having a nitrogen content of 10.5 weight percent and having an average degree of polymerization of 150, 0.3 part of polyethylene glycol having an average molecular weight of 2,000 or 0.3 parts of urethane modified polyethylene glycol prepared by reacting polyethylene glycol having an average molecular weight of 1,000 and hexamethylene diisocyanate at a mole ratio of 2 : 1 were dissolved in a mixture solvent consisting of 50 parts of methanol, 7 parts of acetone, 40 parts of methylethyl ketone and 3 parts of water. Separately, a 35 percent hydrochloric acid solution was diluted with methanol to obtain a 1.0N solution. The resulting solution was mixed with the above-described solution at a volume ratio of 1 : 1. After the resulting solution was left to stand at 25°C. for 5 hours, a 6 cm. × 6 cm. extruded plate of 3 mm. thick methylmethacrylate copolymer containing 6 mole percent of methyl acrylate unit was immersed in the solution for 20 seconds. Then the plate was removed from the solution and subjected to curing reaction at 80°C. for 1 hour in a hot air drier. The results of tests are shown in Table 5.

D. Carbonate modified polyethyleneglycol obtained by reacting polyethyleneglycol having an average molecular weight of 1,000 with diethyl carbonate at a mole ratio of 2 : 1

E. Carboxylate modified polyethyleneglycol obtained by reacting polyethyleneglycol having an average molecular weight of 1,000 with adipic acid at a mole ratio of 2 : 1

F. Carboxylate modified polyethyleneglycol obtained by reacting polyethyleneglycol having an average molecular weight of 1,000 with isophthalic acid at a mole ratio of 2 : 1

G. Amino modified polyethyleneglycol obtained by reacting n-butylamine with ethyleneoxide at a mole ratio of 1 : 28

H. Urethane modified polyethyleneglycol obtained by reacting polyethyleneglycol having an average molecular weight of 1,000 with 4,4'-dicyclohexylmethane diisocyanate at a mole ratio of 2 : 1

Table 5

| Polyalkylene glycol | Adhesion | Pencil hardness | Gloss retention (%) | Transmission retention (%) | Half life time of charged static (sec.) |
| --- | --- | --- | --- | --- | --- |
| Polyethylene glycol | 100/100 | 4H | 37 | 50 | 75 |
| Urethane modified polyethylene glycol | 100/100 | 4H | 43 | 58 | 73 |
| Uncoated plate | — | 2H | 8 | 35 | 8,000 |

EXAMPLE 6

Procedure of Example 2 was repeated except that 5 parts of a polyalkyleneglycol shown below was used instead of the urethane modified polyethyleneglycol and the results of tests are shown in Table 6.

Table 6

| Run No. | Polyalkylene glycol | Adhesion | Pencil hardness | Mar resistance | | Antistat | Specular gloss |
| | | | | Gloss retention (%) | Transmission retention (%) | Half life time of charged static (sec.) | |
| --- | --- | --- | --- | --- | --- | --- | --- |
| 1 | (A) | 100/100 | 5H | 62 | 74 | 18 | 93 |
| 2 | (B) | 100/100 | 5H | 60 | 72 | 34 | 90 |
| 3 | (C) | 100/100 | 5H | 59 | 70 | 41 | 88 |
| 4 | (D) | 100/100 | 5H | 65 | 75 | 15 | 94 |
| 5 | (E) | 100/100 | 5H | 60 | 72 | 17 | 93 |
| 6 | (F) | 100/100 | 5H | 58 | 71 | 17 | 93 |
| 7 | (G) | 100/100 | 5H | 60 | 76 | 1.9 | 92 |
| 8 | (H) | 100/100 | 5H | 61 | 73 | 14 | 93 |

Specular gloss before coating is 75.

A. Polyethyleneglycol having an average molecular weight of 2,000

B. Polypropyleneglycol having an average molecular weight of 2,000

C. Polytetramethyleneglycol having an average molecular weight of 2,000

EXAMPLE 7

Procedure of Example 2 was repeated except that various plates set forth in Table 7 were used instead of the plate of polymethylmethacrylate and the urethane modified polyethyleneglycol was used in an amount of 5 parts. As for the plates of polycapramide and polyhexamethylene adipamide the curing reaction was carried out at 60°C. for 5 hours. The results of tests are shown in Table 7.

EXAMPLE 9

30 parts of hexakis(n-butoxymethyl)melamine, 1.5

Table 7

| Run No. | Plate (thickness:mm.) | Adhesion | Pencil hardness | Specular gloss |
|---|---|---|---|---|
| 1 | Cellulose diacetate (0.25) | 95/100 | 5H (2H*) | 120 |
| 2 | Cellulose triacetate (0.25) | 100/100 | 5H (2H) | 125 |
| 3 | Acrylonitrile-butadiene-styrene copolymer (3) | 100/100 | 3H (F) | 120 |
| 4 | Polycaprolactam (3) | 96/100 | 3H (H) | 125 |
| 5 | Polyhexamethylene adipamide (3) | 100/100 | 2H (F) | 120 |
| 6 | Polycarbonate (3) | 90/100 | 3H (HB) | 130 |
| 7 | Unsaturated polyester (3) | 100/100 | 5H (3H) | 120 |

Note: * Pencil hardness before coating
(1) Cellulose diacetate made by Fuji Photo Film Co., "Fuji Tac D"
(2) Cellulose triacetate made by Fuji Photo Film Co., " Fuji Tac"
(3) Acrylonitrile-butadiene-styrene copolymer made by Asahi-Dow K.K., "Styrac 200"
(4) Polycapramide made by Toray Co., Ltd.
(5) Polyhexamethylene adipamide made by Asahi Kasei Kogyo K.K., "Leona 1300"
(6) Polycarbonate made by Teijin Ltd., "Panlite"
(7) Unsaturated polyester made by Takeda Pharmaceutical Co., "Polymal 8235-A"

EXAMPLE 8

30 parts of hexakis(methoxymethyl)melamine, 0.6 part of tetraethyl silicate, 0.3 part of nitrocellulose having a nitrogen content of 11.9 weight percent and having an average degree of polymerization of 85 and a desired amount of urethane modified polyethylene glycol were dissolved in a mixture solvent consisting of 40 parts of ethanol, 48 parts of isobutyl acetate and 1 part of n-amyl acetate. Separately, a 35 percent hydrochloric acid solution was diluted with ethanol to obtain a 1.4 N solution. The resulting solution was mixed with the above-described solution at a volume ratio of 1 : 2. After the resulting solution was left to stand at 20°C. for 5 hours, a 6 cm. × 6 cm. cast plate of 3 mm. thick polymethylmethacrylate was immersed in the solution 20 seconds. Then, the plate was removed from the solution and subjected to curing reaction at 80°C. for 1 hour in a hot air drier. The thickness of a coating was 2 microns. The same tests as in Example 4 were carried out and the results are shown in Table 8.

parts of tetraethyl silicate, 0.3 part of nitrocellulose having a nitrogen content of 11.9 weight percent and having an average degree of polymerization of 85 and 3.0 parts of a polyalkyleneglycol set forth in Table 9 were dissolved in the same mixture solvent as in Example 3. Separately an about 35 percent hydrochloric acid solution was diluted with methanol to obtain a 0.8 N solution. This solution was mixed with the above-described solution at a volume ratio of 1 : 1. After the resulting solution was left to stand at 20°C. for one, a cast plate of polymethylmethacrylate was immersed in the solution for 25 seconds. Then the plate was removed from the solution and subjected to curing reaction at 100°C. for 2 hours in a hot air drier. The thickness of a coating was 2 microns. The results of tests are shown in Table 9.

EXAMPLE 10

50 parts of hexakis(methoxymethyl)melamine, hexakis(ethoxymethyl) melamine or hexakis(isopropoxymethyl)melamine, 0.25 part of nitrocellulose having Table 8

| Run No. | Amount of polyethylene glycol (part) | Adhesion | Pencil hardness | Mar resistance Gloss retention (%) | Mar resistance Transmission retention (%) | Abrasion resistance | Antistat Half life time of charged static (sec.) |
|---|---|---|---|---|---|---|---|
| 1 | 0 | 100/100 | 4H | 51 | 70 | 540-560 | 83 |
| 2 | 1.5 | 100/100 | 5H | 70 | 85 | 580-600 | 20 |
| 3 | 10 | 100/100 | 5H | 69 | 83 | 620-640 | 5 |
| 4 | 15 | 100/100 | 4H | 65 | 80 | 660-680 | 4 |
| 5 | 20 | 100/100 | 3H | 20 | 70 | 620-640 | 3 |
| Reference Uncoated plate | — | | 3H | 11 | 65 | 2-4 | |

Table 9

| Run No. | Polyalkylene glycol | Adhesion | Pencil hardness | Mar resistance Gloss retention (%) | Mar resistance Transmission retention (%) | Abrasion resistance | Antistat Half life time of charged static (sec.) |
|---|---|---|---|---|---|---|---|
| 1 | (A) | 100/100 | 5H | 65 | 76 | 620-640 | 8 |
| 2 | (B) | 100/100 | 5H | 65 | 75 | 620-640 | 13 |

Table 9 — Continued

| Run No. | Polyalkylene glycol | Adhesion | Pencil hardness | Mar resistance | | Abrasion resistance | Antistat Half life time of charged static (sec.) |
|---|---|---|---|---|---|---|---|
| | | | | Gloss retention (%) | Transmission retention (%) | | |
| 3 | (C) | 100/100 | 5H | 68 | 80 | 640–660 | 7 |
| 4 | (D) | 100/100 | 5H | 65 | 77 | 640–660 | 7 |
| 5 | (E) | 100/100 | 5H | 63 | 72 | 580–600 | 2 |
| Reference Uncoated plate | | — | 3H | 11 | 65 | 2–4 | |

(A) Polyethylene glycol having an average molecular weight of 2,000
(B) Polypropylene glycol having an average molecular weight of 2,000
(C) Product prepared by reacting polyethylene glycol having an average molecular weight of 1,000 and diethyl carbonate at a mole ratio of 2 : 1
(D) Product prepared by reacting polyethylene glycol having an average molecular weight of 1,000 and adipic acid at a mole ratio of 2 : 1.
(E) Product prepared by reacting ethyleneoxide and n-butylamine at a mole ratio of 28 : 1.

a nitrogen content of 11.9 weight percent and having an average degree of polymerization of 85, 0.5 part of tetraethyl silicate and 0.5 part of urethane modified polyethylene glycol prepared by reacting polyethylene glycol having an average molecular weight of 1,000 and hexamethylene diisocyanate at a mole ratio of 3 : 2 were dissolved in a mixture solvent consisting of 3 parts of methanol, 50 parts of ethanol, 5 parts of n-butanol, 40 parts of methylethyl ketone and 2 parts of water.

Separately, a 35 percent hydrochloric acid solution was diluted with methanol to obtain a 0.8 N solution. The resulting solution was mixed with the above-described solution at a volume ratio of 1 : 1. After the resulting solution was left to stand at 25°C. for 3 hours, an injection-molded lens of methylmethacrylate copolymer containing 1.5 mole percent methyl acrylate unit was in the solution for 20 seconds. Then, the lens was removed from the solution and subjected to curing reaction at 80°C. for 2 hours in a hot air drier. The lens thus obtained was subjected to the same tests as in Example 3 and the results are shown in Table 10.

EXAMPLE 11

30 parts of hexakis(n-methoxymethyl)melamine, 0.3 part of nitrocellulose having a nitrogen content of 10.5 weight percent and having an average degree of polymerization of 150, a desired amount of tetramethyl silicate set forth in Table 11 and 0.3 part of urethane modified polyethylene glycol prepared by reacting polyethylene glycol having an average molecular weight of 1,000 and hexamethylene diisocyanate at a mole ratio of 3 : 2 were dissolved in the same mixture solvent as in Example 10. Separately a 35 percent hydrochloric acid solution was diluted with methanol to obtain a 1.1 N solution. The resulting solution was mixed with the above-described solution at a volume ratio of 1 : 1. After the resulting solution was left to stand at 25°C. for 5 hours, a 10 cm. × 10 cm. extruded plate of 3 mm. thick methylmethacrylate copolymer containing 6 mole percent of methylacrylate unit was immersed in the solution for 30 seconds. Then, the plate was re- Table 11

| Run No. | Amount of tetramethyl silicate (part) | Film of performance coated layer | Adhesion | pencil hardness | Mar resistance | | Abrasion resistance |
|---|---|---|---|---|---|---|---|
| | | | | | Gloss retention (%) | Transmission retention (%) | |
| 1 | 0 | Good | 100/100 | 4H | 43 | 63 | 100–120 |
| 2 | 0.003 | Good | 100/100 | 4H | 45 | 64 | 120–140 |
| 3 | 0.03 | Good | 100/100 | 4H | 46 | 66 | 200–220 |
| 4 | 0.3 | Good | 100/100 | 4H | 50 | 69 | 260–280 |
| 5 | 3.0 | Good | 100/100 | 4H | 47 | 67 | 280–300 |
| 6 | 6.0 | Good | 100/100 | 4H | 43 | 67 | 260–280 |
| 7 | 7.0 | Irregular | 100/100 | 3H | 37 | 50 | 180–200 |
| Reference Uncoated plate | | Irregular | — | 2H | 8 | 35 | 1–2 |

Table 10

| Etherified methylol melamine | Adhesion | Pencil hardness | Gloss retention (%) | Transmission retention (%) | Abrasion resistance | Half life time of charged static (sec.) |
|---|---|---|---|---|---|---|
| Methoxy compound | 100/100 | 4H | 260–280 | 50 | 65 | 50 |
| Ethoxy compound | 100/100 | 4H | 220–240 | 45 | 59 | 42 |
| Isopropoxy compound | 100/100 | 3H | 160–180 | 33 | 52 | 31 |
| Reference Uncoated plate | | 2H | 1–2 | 9 | 41 | 10,000 | moved from the solution and subjected to curing reaction at 80°C. for 2 hours in a hot air drier. The thickness of a coating was 3 microns. The same tests as in Example 10 were carried out and the results are shown in Table 11.

EXAMPLE 12

30 parts of hexakis(methoxy methyl)melamine, 0.3 part of the same nitrocellulose as in Example 3, 6 parts of urethane modified polyethylene glycol prepared by reacting polyethyleneglycol having a molecular weight of 1,000 and hexamethylene diisocyanate at a mole ratio of 3 : 2 and a desired amount of Oil Yellow G (C.I.: Solvent Yellow 2, made by Toyo Ink Mfg. Co., Ltd.) were dissolved in 15 parts of ethanol, 65 parts of chloroform, 15 parts of isobutyl acetate, 2 parts of n-amyl acetate and 3 parts of water. Separately, a 35 percent hydrochloric acid solution was diluted with ethanol to obtain a 0.8 N solution. This solution was mixed with the above-described solution at a volume ratio of 1 : 1. After the resulting solution was left to stand at 20°C. for 1 hour, a 6 cm. × 6 cm. cast plate of 3 mm. thick polymethylmethacrylate which was sufficiently washed and dried, was immersed in the solution for 25 seconds. Then the plate was removed from the solution and placed in a hot air drier and subjected to curing reaction at 100°C. for 1 hour. The thickness of a coating was 2 microns. The degree of coloring was judged by eyes. The degree of coloring 1 means that a coloring is hardly observed and that of 5 means that the deepest coloring is observed. The degrees of coloring 2, 3 and 4 lie between the degree of coloring 1 and 5.

lar weight of 400, 1.0 part of the oil soluble dye set forth in Table 13 and 0.3 part of nitrocellulose having a nitrogen content of 11.9 weight percent and an average degree of polymerization of 85 were dissolved in a mixture solvent consisting of 49 parts of ethanol, 4 parts of n-butanol, 46 parts of methylethyl ketone and 1 part of water. Separately, a 35 percent hydrochloric acid solution was diluted with methanol to obtain a 1.0N solution. This solution was mixed with the above-described solution at a volume ratio of 1 : 1. After the resulting solution was left to stand at 25°C. for 5 hours, a 10 cm. × 10 cm. extruded plate of 3 mm. thick methylmethacrylate copolymer containing 6 mole percent of methylacrylate unit which was well washed was immersed for 20 seconds. The thickness of a coating was 2 microns. Then, the plate was removed from the solution and subjected to curing reaction at 80°C. for 1 hour in a hot air drier. The results of tests are shown in Table 13.

Table 13

| Run No. | Color index of dye | Degree of coloring | Adhesion | Pencil hardness | Gloss of mirror plane | Mar resistance Gloss retention (%) | Antistat Half life time of charged static (sec.) |
|---|---|---|---|---|---|---|---|
| 1 | Solvent red 84 | 4 | 100/100 | 4H | 89 | 53 | 4 |
| 2 | Solvent blue 45 | 4 | 100/100 | 4H | 89 | 55 | 4 |
| 3 | Solvent violet 21 | 4 | 100/100 | 4H | 87 | 49 | 4 |
| Reference Uncoated plate | — | — | — | 2H | 75 | 8 | 8,000 |

Note: C.I. Solvent red 84: "Spilon red GEH" made by Hodogaya Chem. Inc. Co., Ltd.
C.I. Solvent blue 45: "Savinyl blue RS" made by Sandoz A.G.
C.I. Solvent violet 21: "Spilon violet RH" made by Hodogaya Chem. Inc. Co., Ltd.

EXAMPLE 14

30 parts of hexakis(methoxymethyl)melamine, 5 parts of urethane modified polyethyleneglycol prepared by reacting polyethylene-glycol having an average molecular weight of 1,000 and hexamethylene diisocyanate at a mole ratio of 2 : 1 and 0.3 part of nitrocellulose having a nitrogen content of 11.9 weight percent and an average degree of polymerization of 85 were dissolved in a mixture solvent consisting of 40 parts of ethanol, 48 parts of chloroform, 11 parts of isobutyl acetate and 1 part of n-amyl acetate. Separately, 14 parts of p-toluenesulfonic acid, 8 parts of phosphoric acid, 18 parts of oxalic acid or 18 parts of acetic Table 12

| Run No. | Amount of dye (part) | Degree of coloring | Adhesion | Pencil hardness | Specular gloss | Mar resistance Gloss retention (%) |
|---|---|---|---|---|---|---|
| 1 | 0 | 1 | 100/100 | 5H | 100 | 69 |
| 2 | 0.03 | 1 | 100/100 | 5H | 100 | 69 |
| 3 | 0.15 | 2 | 100/100 | 5H | 95 | 67 |
| 4 | 0.6 | 4 | 100/100 | 5H | 93 | 65 |
| 5 | 1.8 | 5 | 100/100 | 4H | 90 | 65 |
| 6 | 2.1 | 5 | 70/100 | 3H | 87 | 56 |
| Reference Uncoated plate | — | — | — | 3H | 75 | 11 |

EXAMPLE 13

30 parts of hexakis(methoxymethyl)melamine, 1.5 parts of polyethyleneglycol having an average molecuacid were dissolved in or mixed with 46 parts of methanol, respectively. Each of these solutions or mixtures was mixed with the above-described solution and the resulting solution was left to stand at 20°C. for one hour. A 6 cm. × 6 cm. cast plate of 3 mm. thick polymethylmethacrylate was immersed in the solution for 30 seconds and then removed from the solution and subjected to curing reaction at 80°C. in a hot air drier for one hour in the case of p-toluene-sulfonic acid, phosphoric acid or oxalic acid as the catalyst and for 2 hours in the case of acetic acid as the catalyst. The thickness of a coating was 3 microns. The results of tests are shown in Table 14.

group $R^2$ is —$CH_2CH_2$— group; $m$ represents an positive integer; and $n$ is an integer of 1 to 10, and (D) about 0.01 to 12 moles, based on one mole of said etherified methylolmelamine, of an acid catalyst.

2. A composition as claimed in claim 1, containing about 0.1 to 20 parts by weight of tetramethyl silicate or tetraethyl silicate.

3. A composition as claimed in claim 1, containing about 0.5 to 6 parts by weight of an oil soluble dye.

4. A composition as claimed in claim 2, containing

Table 14

| Run No. | Acid catalyst | Adhesion | Pencil hardness | Mar resistance | | Antistat Half life time of charged static (sec.) |
|---|---|---|---|---|---|---|
| | | | | Gloss retention (%) | Transmission retention (%) | |
| 1 | p-toluenesulfonic acid | 100/100 | 6H | 73 | 87 | 15 |
| 2 | Phosphoric acid | 100/100 | 4H | 61 | 74 | 8.5 |
| 3 | Oxalic acid | 100/100 | 5H | 63 | 78 | 10 |
| 4 | Acetic acid | 100/100 | 4H | 45 | 60 | 2.1 |
| Reference Uncoated plate | | — | 3H | 11 | 65 | |

What is claimed is:

1. A composition for coating surfaces of shaped article of synthetic resins which comprises (A) 100 parts by weight of an etherified methylolmelamine of the formula

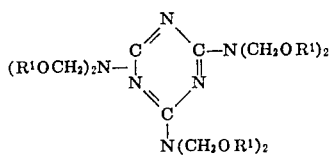

wherein $R^1$ represents an alkyl group having 1 to 4 carbon atoms, (B) about 0.01 to 5 parts by weight of a nitrocellulose, (C) about 1 to 50 parts by weight of at least one alkyleneglycol selected from the group consisting of:

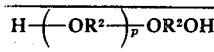

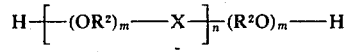

wherein $R^2$ represents —$CH_2CH_2$—, —$CH_2CH(CH_3)$— or —$(CH_2)_4$— group; $p$ is 0 or a positive integer; X represents

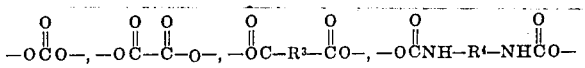

group wherein $R^3$ represents an alkylene group having 1 to 14 carbon atoms, phenylene or cyclohexylene group; $R^4$ represents an alkylene group having 2 to 17 carbon atoms, phenylene or cyclohexylene group; $R^5$ represents an alkyl group having 1 to 8 carbon atoms and when X represents

about 0.5 to 6 parts by weight of an oil soluble dye.

5. A composition as claimed in claim 1, wherein said acid catalyst is used in an amount of about 0.5 to 2 moles per mole of the etherified methylolmelamine.

6. A composition as claimed in claim 5, wherein said acid catalyst is selected from the group consisting of hydrochloric acid, phosphoric acid, oxalic acid, p-toluenesulfonic acid and acetic acid.

7. A composition as claimed in claim 1, wherein said nitrocellulose has a nitrogen content of about 9 to 12.5 weight percent and an average degree of polymerization of about 30 to 1,000.

8. A shaped article of a synthetic resin, the surfaces of which are coated with a layer which is the heat-cured product of the composition comprising (A) 100 parts. by weight of an etherified methylolmelamine of the formula

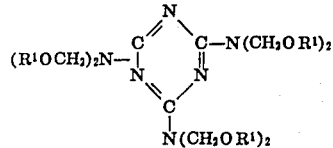

wherein $R^1$ represents an alkyl group having 1 to 4 carbon atoms, (B) about 0.01 to 5 parts by weight of a nitrocellulose, (C) about 1 to 50 parts by weight of at least one alkyleneglycol selected from the group consisting of:

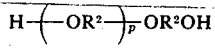

and

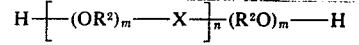

wherein $R^2$ represents —$CH_2CH_2$—, —$CH_2CH(CH_3)$— or —$(CH_2)_4$— group; $p$ is 0 or a positive integer; X represents

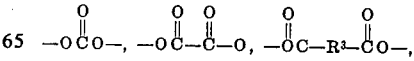

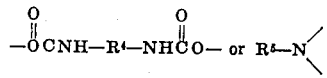

group wherein $R^3$ represents an alkylene group having 1 to 14 carbon atoms, phenylene or cyclohexylene group; $R^4$ represents an alkylene group having 2 to 17 carbon atoms, phenylene or cyclohexylene group; $R^5$ represents an alkyl group having 1 to 8 carbon atoms and when X represents

group $R^2$ is —$CH_2CH_2$— group; $m$ represents an positive integer; and $n$ is an integer of 1 to 10, and (D) about 0.01 to 12 moles, based on one mole of said etherified methlolmelamine, of an acid catalyst.

9. A shaped article according to claim 8, wherein the synthetic resin is selected from the group consisting of polymethylmethacrylate methylmethacrylate copolymer containing about 0.5 to 15 mole percent of methylacrylate unit, polyamide, polycarbonate, cellulose diacetate, cellulose triacetate, acrylonitrile-butadiene-styrene copolymer and unsaturated polyester.

10. A shaped article according to claim 8, wherein said composition contains about 0.1 to 20 parts by weight of tetramethyl silicate or tetraethyl silicate.

11. A shaped article according to claim 10, wherein said composition also contains about 0.5 to 6 parts by weight of an oil soluble dye.

12. A shaped article according to claim 8, wherein the thickness of said layer is about 0.5 to 30 microns.

13. A shaped article according to claim 10, wherein said shaped article is a lens of methylmethacrylate copolymer containing about 0.5 to 15 mole percent of methylacrylate unit.

14. A shaped article according to claim 10, wherein said shaped article is a plate of polymethylmethacrylate.

15. A process for improving surface properties of a shaped article of a synthetic resin which comprises coating a shaped article of a synthetic resin with a solution of a composition comprising (A) 100 parts by weight of an etherified methylolmelamine of the formula

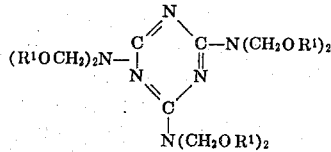

wherein $R^1$ represents an alkyl group having 1 to 4 carbon atoms, (B) about 0.01 to 5 parts by weight of a nitrocellulose, (C) about 1 to 50 parts by weight of at least one alkyleneglycol selected from the group consisting of:

H— $OR^2$ —$OR^2OH$
and
H — ( $OR^2$ )$_m$—X— ( $R^2O$ )—H wherein $R^2$ represents —$CH_2CH_2$—, —$CH_2CH(CH_3)$— or —$(CH_2)_4$— group; $p$ is O or a positive integer; X represents

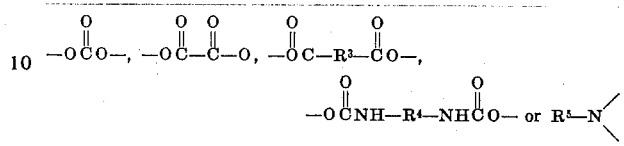

group wherein $R^3$ represents an alkylene group having 1 to 14 carbon atoms, phenylene or cyclohexylene group; $R^4$ represents an alkylene group having 2 to 17 carbon atoms, phenylene or cyclohexylene group; $R^5$ represents an alkyl group having 1 to 8 carbon atoms and when X represents

group $R^2$ is —$CH_2CH_2$— group; $m$ represents an positive integer; and $n$ is an integer of 1 to 10, and (D) about 0.01 to 12 moles, based on one mole of said etherified methylolmelamine, of an acid catalyst, and heat-curing the resulting coating at a temperature of from about 50°C. to the temperature below the heat distortion temperature of said synthetic resin.

16. A process as claimed in claim 15, wherein said composition contains about 0.1 to 20 parts by weight of tetramethyl silicate or tetraethyl silicate.

17. A process as claimed in claim 15, wherein said composition also contains about 0.5 to 6 parts by weight of an oil soluble dye.

18. A process as claimed in claim 15, wherein said synthetic resin is a polymer selected from the group consisting of polymethylmethacrylate, polyamide, polycarbonate, cellulose diacetate, cellulose triacetate, acrylonitrile-butadiene-styrene copolymer and unsaturated polyester and the solvent for said composition is a mixture solvent essentially comprising of (a) at least one alcohol, (b) chloroform, (c) at least one acetate and (d) water.

19. A process as claimed in claim 15, wherein said synthetic resin is a methylmethacrylate copolymer containing about 0.5 to 15 mole percent of methylacrylate unit and the solvent for said composition is a mixture solvent essentially comprising (a) at least one alcohol, (b) at least one ketone and (c) water.

20. A process as claimed in claim 15, wherein said acid catalyst is selected from the group consisting of hydrochloric acid, phosphoric acid, p-toluenesulfonic acid, oxalic acid and acetic acid.

* * * * *

PO-1050
(5/69)

UNITED STATES PATENT OFFICE
CERTIFICATE OF CORRECTION

Patent No. 3,785,861          Dated  January 15, 1974

Inventor(s)  Noboru Tanimura et al

It is certified that error appears in the above-identified patent and that said Letters Patent are hereby corrected as shown below:

Col. 9, Table 4, under Heading "Adhesion", Run No. 2, change "62/10" to -- 62/100 --.

Col. 22, lines 1, 2 and 3, Claim 15, cancel in their entirety and substitute therefor :

-- $H-(OR^2)_{\overline{p}}-OR^2OH$ and $H-[(OR^2)_{\overline{m}}-X]_{\overline{n}}-(R^2O)_{\overline{m}}-H$ --.

Signed and sealed this 27th day of August 1974.

(SEAL)
Attest:

McCOY M. GIBSON, JR.
Attesting Officer

C. MARSHALL DANN
Commissioner of Patents